United States Patent [19]

Ban et al.

[11] 4,130,780

[45] Dec. 19, 1978

[54] ELECTRONIC PHOTOFLASH

[76] Inventors: Itsuki Ban, 829, Higashi-Oizumi-machin, Nerima-ku, Tokyo; Kyoichi Inoue, 2-13, Hagiyama-machi, Higashi-murayama-shi, Tokyo; Takatoshi Kogure, 3-30-24, Soshigaya, Setagaya-ku, Tokyo, all of Japan

[21] Appl. No.: 847,431

[22] Filed: Nov. 1, 1977

[30] Foreign Application Priority Data

Nov. 9, 1976 [JP] Japan ................................ 51-133782

[51] Int. Cl.$^2$ ............................................. H05B 41/32
[52] U.S. Cl. ................................ 315/241 P; 315/362; 320/1; 354/145
[58] Field of Search ................ 315/241 P, 362; 320/1; 354/137, 145

[56] References Cited

U.S. PATENT DOCUMENTS

| 3,764,849 | 10/1973 | Ohta | 315/241 P |
| 4,001,640 | 1/1977 | Biber | 315/241 P |
| 4,023,068 | 5/1977 | Harvey | 320/1 X |

FOREIGN PATENT DOCUMENTS 1129618  5/1962  Fed. Rep. of Germany ....... 315/241 P

*Primary Examiner*—Eugene R. LaRoche
*Attorney, Agent, or Firm*—Lane, Aitken & Ziems

[57] ABSTRACT

A battery operated, capacitor discharge type electronic, photoflash system having an electro-mechanical switching means for automatically disconnecting the battery to minimize unnecessary discharge of the battery. The system causes the battery to be disconnected at a predetermined time interval after a charge cycle has been started for a discharged main capacitor or after the main capacitor has been fully charged for a predetermined period of time.

16 Claims, 6 Drawing Figures

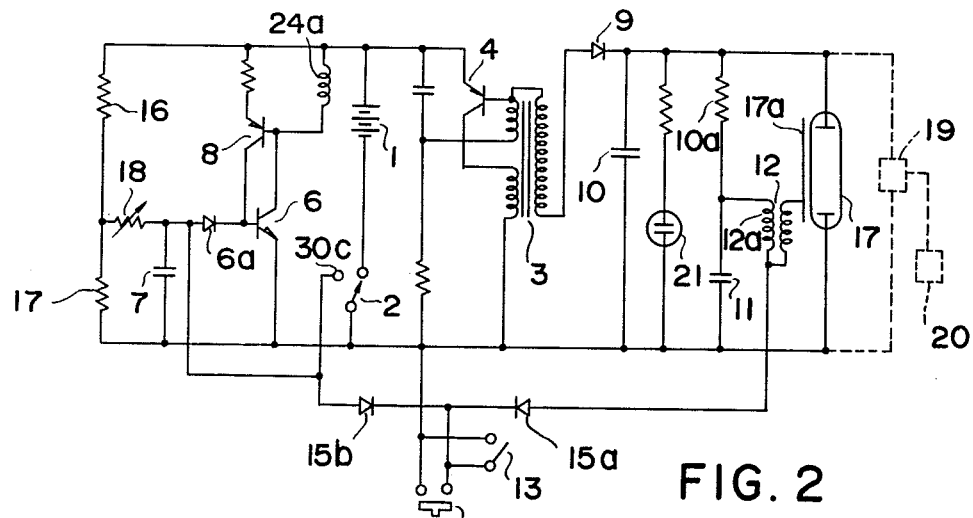
FIG. 1
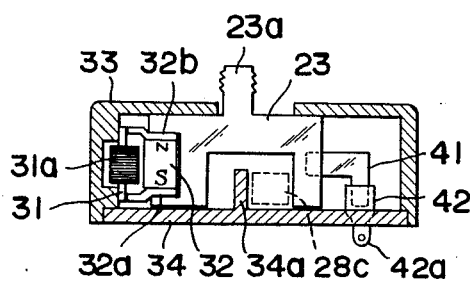
FIG. 2
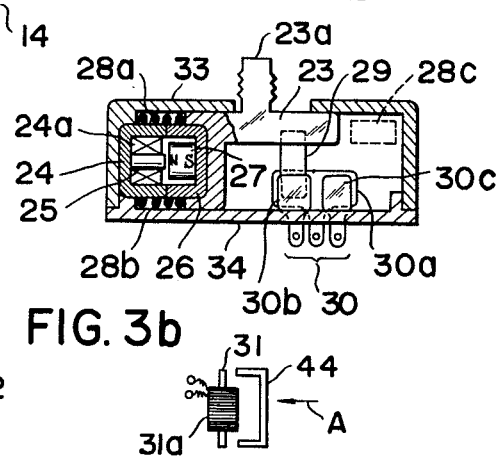
FIG. 3a
FIG. 3b
FIG. 3c
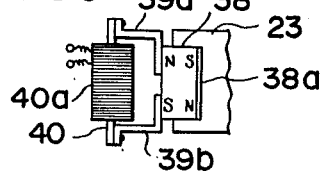
FIG. 4

ELECTRONIC PHOTOFLASH

BACKGROUND AND SUMMARY OF THE INVENTION

The present invention relates to an electronic photoflash system having features to avoid wasteful consumption of energy stored in a battery power supply when, for example, the user forgets or neglects to open a switch after the photoflash system has been fully charged or between successive uses of the system.

Electronic photoflash systems using battery power supplies and storage capacitors supplied with relatively high voltage, direct current from an oscillator-rectifier circuit to operate a flash lamp are well known in the art. In such systems the energy stored in the batteries can be rapidly consumed if the user is not careful to switch the batteries out of the circuit after the storage capacitor has been fully charged. If the energy of the batteries is thus consumed, the photoflash system may thereafter be unable to flash the flash lamp, and as a result it may not be possible to take important or valuable photographs. When commercially available batteries are used, it may be possible to replace the consumed batteries with new ones so that pictures can be taken, but often the fact that the batteries have run down is not recognized until the user attempts to take a photograph. Moreover, when nickel-cadmium type rechargeable batteries are used, it may not be possible to easily replace them and recharging may take too much time.

The present invention is intended to overcome or avoid these problems. The system according to the invention is simple in construction and has no expensive parts and, therefore, the photoflash system can be produced at a low cost. The invention includes a voltage source switching means which automatically opens the connection between the battery power supply and the photoflash circuitry should the user forget or neglect to open the switch manually. The voltage source switching means may, however, be manually closed for subsequent photoflash uses. Another advantage of the present invention is that when the voltage source switching means is opened, a readily noticeable sound is produced, mechanically, and the user is, therefore, able to know that the voltage source switch has automatically opened due to the period of time which has elapsed since the previous photoflash use. Still another advantage of the present invention is that the photoflash consumes a minimum of electric power and can be made small in size and light in weight because the switch closing operation is performed manually and the switch opening operation is controlled by a discharge current.

BRIEF DESCRIPTION OF THE DRAWINGS

FIG. 1 is a schematic diagram of a photoflash system circuit according to the invention.

FIG. 2 is a partially sectional front view of one embodiment of the voltage source switch of the invention.

FIG. 3a is a partially front view of another embodiment of the voltage source switch of the invention.

FIG. 3b is a view of an electro-mechanical mechanism useable in an embodiment of a voltage source switch according to the invention.

FIG. 3c is a view of another electro-mechanical mechanism useable with another embodiment of a voltage source switch according to the invention.

FIG. 4 is a schematic diagram similar to that of FIG. 1 of another embodiment of a photoflash system circuit according to the invention.

DESCRIPTION OF THE PREFERRED EMBODIMENT

In FIG. 1, a voltage source 1 such as dry batteries or rechargeable nickel-cadimum batteries is shown in a photoflash system circuit including a transformer 3 connected to a transistor 4 in an oscillator circuit capable of producing oscillations in the range of several thousand Hz when a voltage source switch 2 is in the closed position as shown. The output of a secondary coil of the oscillating transformer 3 is connected to and rectified by a diode 9. With this arrangement a voltage of approximately 350 v DC is provided to charge and store energy in a storage capacitor 10. A resistor 10a, a capacitor 11, a triggering transformer 12, and a triggering electrode 17a are connected in a manner well known in the art to form a triggering circuit. When a shutter (not shown) of a camera (not shown) is opened and closed a synchronous switch 13 included in the camera (not shown) is closed, thereby causing the electric charge energy stored in the capacitor 11 to be discharged through a first coil 12a and a diode 15a. This causes a high voltage to be provided to the triggering electrode 17a of a flash lamp or flash tube 17 which causes the lamp to flash due to the flow of current through the flash tube 17 from the charge stored in the capacitor 10. The flash continues until the discharge terminates.

In the case of a light control electronic photoflasher, control of the light flash is necessarily effected at the time of the flash using means such as shown by the dotted lines in FIG. 1. For example, a sensing means 20 integrates photoflash light reflected from an object and causes a switching element 19 to become conductive after a predetermined amount of light has been detected. Accordingly, a portion of the electric energy from the capacitor 10 is bypassed through the switching element 19.

In normal operation the photoflash circuit begins to recharge capacitor 10 immediately after discharge. When charging or recharging is completed a neon lamp 21 lights to indicate completion of the charging. The neon lamp 21 is sometimes referred to as a "ready light".

According to the present invention, when the voltage source switch 2 is closed as previously described, the transistor 4 begin to oscillate and the capacitor 10 is charged. At the same time a capacitor 7 starts to be charged through a network of resistors 16, 17 and 18. As the capacitor 7 continues to be charged, the voltage across it increases until a transistor 6 is made conductive by current provided through a diode 6a. Simultaneously, base current is supplied through the transistor 6 to a transistor 8, causing the transistor 8 to become conductive, and, in turn, causing the base current for the transistor 6 to be increased. This circuit arrangement caused a coil 24a to be supplied with current.

The capacitor 7 and the resistor 18 constitute a time-constant circuit establishing a predetermined time interval between the closing of the voltage source switch 2 and the time at which current is supplied to the coil 24a. As will be further described, when the coil 24a is energized, the arm of the voltage source switch 2 is caused to move mechanically (to the left in FIG. 2) to open the circuit to the battery 1. This also causes the current supply to the coil 24a to be shut off.

The voltage source switch 2 will now be further described with reference to FIG. 2 in which a casing 33 consisting of a plastic formation is provided with a bottom plate 34 bonded thereto at the bottom thereof. An actuator 23 of a plastic formation having a knob 23a is slidably mounted in the casing 33 for movement to the left and right as shown in FIG. 2. A pot-shaped soft steel yoke 24 is fixedly mounted in the left interior portion of the casing 33. A magnetic core 25 such as a soft steel bar is positioned therein at the center of the bottom surface (side wall in FIG. 2) thereof. The coil 24a is wound around the magnetic core 25.

Another pot-shaped soft steel yoke 26 is fixed at the left end of the actuator 23 and a ferrite magnet 27 inside thereof is magnetized with its North and South poles in the left and right directions corresponding to the sliding directions of the actuator 23. The open portions of each yoke 24 and 26 face each other, so that when the knob 23a is manually pressed leftwardly against the spring force of an expansion spring 28a to move the actuator 23, the open portions of the yokes 24 and 25 contact each other and the magnetic circuit including the magnet 27 is sufficiently closed for operation. Accordingly, the open portions of the yokes 24 and 26 are strongly attracted. A tension spring such as shown by a dotted line 28c may be used instead of the expansion spring 28a.

A conductive wiper 29 has one end thereof embedded in the actuator 23. Three electric contacts 30 (30a, 30b, 30c) are fixedly arranged on the bottom plate 34 and the respective terminals thereof are projected out of the bottom plate. The contact 30a is opposite to the contacts 30b, 30c with a space therebetween, and the wiper 29 is pressed into the space. Therefore, the actuator 23 acts as a change-over switch, namely as the actuator 23 is displaced in the leftward direction, the contact 30a and the contact 30b are connected. On the other hand, if the actuator 23 is displaced in the rightward direction, the contact 30a and the contact 30c are connected in a manner corresponding to that shown for switch 2 in FIG. 1. Accordingly, it is seen that the power source switch of FIG. 1 is "opened" to disconnect the batteries when the actuator 23 is displaced in the leftward direction as shown in FIG. 2.

The coil 24a is energized after a predetermined time if the batteries 1 are supplied by the switch 2 to the circuit, but the magnetic flux generated by the coil 24a is directed in the opposite direction from that of the magnet coil 27 in FIG. 2. As the result, the magnetic fluxes offset and cancel and the actuator 23, therefore, springs back in the rightward direction causing the power source 2 to be automatically switched out of connection with the photoflash circuit. Simultaneously the transistor 6 and 8 become non-conductive because the capacitor 7 discharges through the contact 30c.

Should the user again cause the power source 1 to be supplied to the circuit due to manual operation of the power switch 2, the time-constant circuit will be again actuated to again shut-off the power switch 2 after a predetermined time interval. This will happen because the time-constant or delay circuit will have returned to an uncharged condition as a result of the discharge of the capacitor 7.

The lock of the actuator 23 by means of magnetic attraction can be effectively attained by use of a relatively small magnet 27 because the path of the magnetic flux is completely closed by a pot-type yoke. Similarly, if the coil 24a is made relatively small, the power consumption can be made quite small even it considerable electric current is required for the coil 24a because the power switch is opened soon after the coil 24a is energized. Also, because the lock of the actuator 23 is not mechanical, the mechanism is relatively immune from problems caused by frictional forces, etc. Also, because the locking force is relatively strong, the spring 28a can be made strong accordingly, so as to cause the actuator 23 to have an exact, positive slide movement between the opened and closed switch positions. With the adoption of these structural features, the switching means according to the present invention provides an economical switch of small dimensions capable of being housed in a conventional molded plastic housing.

According to the present invention, should the photoflash user forget to open the switch 2 after electric power has been supplied sufficiently to charge the capacitor 10 to the "ready" condition, the power source will then be automatically, cut-off after a predetermined time interval, preferably in the range of 3 to 5 minutes, so that there will be no careless or wasteful consumption of the energy stored in the batteries.

When the user desires to take another photograph using the photoflash, the synchro-switch 13 is again closed. This causes the capacitor 7 to be discharged through diode 15b. As the result of that discharge, the time-constant circuit is effectively reset to provide another time delay interval such as 3 to 5 minutes. Due to these features, a user of the photoflash system of the present invention will not have to learn any new techniques of operation as compared to conventional photoflash devices in the cases in which one or more photographs are to be taken in every 3 to 5 minute interval. However, if the interval between successive photographs exceeds that interval, the user must be careful to first check the ready light 21 or else there may be an attempt to take a photograph without a photoflash. If the ready light 21 is not lighted in such a case, the user must manually operate the actuator 23 to the on position, and then wait for the ready light 21 to light before taking the photograph. To assist the user in remembering to follow these procedures, the actuator 23 provides an audible mechanical sound at the time of being sprung back. This indicates that the power switch 2 has been cut-off.

In FIG. 1, a press button switch 14 is shown to permit test flashes. This switch 14, of course, may also be pressed to reset the time-constant circuit. The variable resistor 18 may also be replaced with a fixed value resistor, but it is advantageous in certain applications to provide a manually adjustable resistor 18 so that the user can adjust the time constant to his particular conditions of use.

In the foregoing embodiment, the energizing control of the coil 24a is made by detecting the rise of a voltage across the capacitor 7 as additional charge is stored therein. However, a similar result could be achieved, with appropriate modifications to the circuit, by utilizing the time-constant of the discharge of the capacitor after it had been charged.

Another embodiment of a power source switch according to the present invention will now be explained with reference to FIG. 3. In FIG. 3a the elements indicated by the same numerals as used in FIG. 2 have the same operation and will, therefore, not be further explained.

In this embodiment, a wiper 41 has one end embedded in the right side of the actuator 23, and two contact pieces 42 are fixedly arranged on the bottom plate 34 in such a manner as to clamp the adjacent part of the wiper 41. These contact pieces have two terminals 42a projected out of the bottom plate. When the actuator 23 is displaced in the rightward direction, the wiper 41 is accordingly displaced out of contact with the contact pieces 42a and the short circuit between the projected terminals 43 (which are two individual terminals) terminates. The expansion spring 28c which normally urges the actuator 23 in the rightward direction is arranged between a projection 34a of the bottom plate 34 and the right side of the actuator 23.

A ferrite magnet 32 is secured to the left side of the actuator 23. The magnet is magnetized in the upper N and lower S poles and has yokes 32a, 32b of mild steel attached to the poles thereof. A magnetic core 31 of mild steel having a coil 31a wound thereabout is secured to the left side wall of the housing. With this arrangement the path of magnetic flux of the magnet 32 is closed by the yokes 32a, 32b and the magnetic core 31 when the actuator 23 is manually displaced in the leftward direction, and the actuator 23 is attracted and locked with a strong force. Simultaneously, the two terminals 42a are connected together. Thereafter, when the coil 31a is energized, a magnetic flux is generated in the opposite direction from that of the magnet 32, cancelling out the attracting force. The actuator 23 is, therefore, sprung back in the rightward direction and the power source is cut off. It will be apparent that the coil 24a in FIG. 1 can be replaced by the coil 31a for the power source switch 2 in FIG. 1 and the wiper 41 and contact 42 can be utilized to attain the general objects of the present invention. With this embodiment, however, the contact 30c does not exist, and, therefore, the object achieved with contact 30c as previously described can no longer be achieved in the same manner. As will be described with reference to FIG. 4, the same general objects, however, can be attained by resetting the time-constant circuit by using a pulse produced at the time of the power source switch 2 is closed.

The structure shown in FIG. 3a is of lesser efficiency than the previously described embodiment, but offers advantages in that the electro-magentic attracting elements 31, 31a,, 32b and 32 can be made smaller and produced at a more economical cost. These advantages can be achieved in part because one pot-shaped yoke can be replaced by the mild steel bar 31, and the other pot-shape yoke can also be replaced by the yokes 32a, 32b of mild steel.

FIG. 3c shows another structure which is still simpler in construction, but which, nevertheless, can provide adequate attracting force. With this embodiment a ferrite magnet 38 which is magnetized laterally in N and S poles is fixedly mounted on the left side of the actuator 23. A yoke 38a of mild steel is fixedly attached on the right side of the magnet 38 for closing the magnetic flux path. A coil 40a is mounted on a magnetic core 40 of mild steel, and yokes 39a, 39b are secured to the respective ends of the magnetic core 40. When the yokes 39a, 39b and the N and S poles of the magnet 38 contact each other as shown after the actuator 23 is displaced in the leftward direction, the path of the magnetic flux of the magnet 38 is closed, and the actuator 23 is attracted with a strong force. Thereafter, when the coil 40a is energized, the magnetic flux is offset and disappears, causing the actuator 23 to be sprung back in the rightward direction, thereby attaining the objects of the invention.

The foregoing embodiments all use a magnetic flux from a permanent magnet for an attracting force. However, the magnetic force of an electromagnet can also be used as shown in FIG. 3b in which a U-shaped yoke 44 of mild steel is secured to the actuator 23 and a magnetic bar or core 31 is secured to the left side of the housing. The coil 31a is mounted on the bar 31. Therefore, when the actuator 23 is displaced in the leftward direction with a condition that the coil 31a is energized, the yoke 44 is displaced in the direction as indicated by the arrow A, and the ends of the yoke contact the corresponding ends of the magnetic core 31 to close the magnetic flux path. As the result, the actuator 23 is attracted and locked. When the coil 31a is de-energized, the actuator 23 is sprung back to cut-off the power source switch. In this embodiment, the device can be made still smaller and produced at a still more economical cost because a permanent magnet is not used. However, the power consumption will be greater during operation. But even so, a power supply capable of providing 3V and 30 mA is typically sufficient for operation of the coil 31a, a requirement which is quite small compared with the power consumption of the photoflash itself.

An electronic photoflash system utilizing the power source switch of FIG. 3b will now be explained with reference to FIG. 4. As previously indicated, elements having the same numerals have the same effect and the explanation thereof will, accordingly, be abbreviated. The power source switch is initially closed by manually displacing the knob 23a in the leftward direction as shown in FIG. 3a. This causes a transistor 43 to become conductive with a base current received through a resistor 6b, and causes the coil 31a to be energized. After 3 to 5 minutes, the capacitor 7 is charged. As the voltage rises across the capacitor 7, current is provided to the base of transistor 6 through a diode 6a and the transistor 6 becomes conductive. The transistor 43 is, in turn, rendered non-conductive, and the coil 31a is de-energized and the actuator 23 springs back to cut-off the power source switch 2. The next time the power source switch 2 is closed again, an integrated pulse is applied to the gate of an SCR 45 through a capacitor 34, causing the SCR 45 to become conductive. This causes the capacitor 7 to discharge which, in turn, renders SCR 45 non-conductive as its anode voltage decreases. As the time-constant circuit resets, the power source switch 2 will again automatically cut-off. If the synchro-switch 13 on the camera (not shown) is closed, the SCR 45 is rendered conductive, and then the capacitor 7 begins to discharge, resetting the time-constant circuit. In other respects, the circuit of FIG. 4 operates in the same manner as the circuit of FIG. 1. For example, the SCR 45 could be replaced by a short circuit caused by a pulse input to the base of the transistor via capacitor 35 or via the synchro-switch 13 in its closed position. The time-constant associated with the capacitor 7 can be utilized either during charging, or discharging.

It is also possible, for example, that the charging current for the capacitor 7 could be obtained from terminal 37 instead of through the resistors 16 and 18. For example, the conductor in the circuit could be severed at the point indicated by numeral 16a and the resistor 16 could then be connected to the terminal 37. When the capacitor 10 in FIG. 1 is charging, the output voltages at the terminal 37 as divided by the resistors 36a and 36b is relatively small, and the capacitor 7 is not completely charged. However, when the main capacitor 10 is fully charged, the neon tube 21 is lighted, and a predetermined voltage is applied to the time-constant circuit. Because the neon tube 21 has a constant voltage property, the output voltage at the terminal 37 will be constant when the tube 21 is lighted, thereby tending to cause the time interval established by the time-constant circuit to be precise and accurately repeatable.

What is claimed is:

1. In an electronic photoflash having a light flash generator means for producing light flashes by discharges of high voltage energy stored in a storage capacitor adapted to be charged with current derived from an oscillator adapted to operate when connected to a battery power supply and wherein the flashing of said electronic photoflash is controlled by the closure of an external switch; the improvement comprising:

a switch means for switching the power supply in and out of connection with the flash generator means including an actuator movable between a first position corresponding to connection between the power supply and the flash generator means and a second position corresponding to no connection between the power supply and the flash generator means; a magnet means operably associated with said actuator and adapted to hold said actuator in said first position by mangetic attraction; spring means operably associated with said actuator for urging said actuator to said second position; a knob connected to said actuator and adapted to be manually manipulated for movement of said actuator to said first position or to said second position; a coil operably associated with said actuator and said magnet means and adapted to produce a magnetic field when supplied with current; a control circuit for supply current to said coil, said control circuit including a delay circuit for providing a predetermined time interval from the time at which the actuator is placed in the first position until when said control circuit provides current to said coil; said magnetic field produced by said coil when supplied with current from said control circuit being sufficient to overcome the magnetic attraction of said magnet means so that said actuator is no longer held in said first position and is returned to said second position by said spring means; and said delay circuit including means for resetting said delay circuit each time the electronic photoflash is flashed.

2. The improvement according to claim 1 wherein the delay circuit includes a time constant circuit and means for applying a voltage to said time constant circuit derived from the voltage across a neon light connected in parallel with the storage capacitor.

3. The improvement according to claim 1 wherein the delay circuit includes a time constant circuit having a resistor; a timing capacitor; and means for detecting the voltage across said timing capacitor.

4. The improvement according to claim 1 wherein said magnet means is mounted on said actuator, and including a magnetic core positioned for operable association with said magnet means in said first position and being adapted to attract said magnet means thereto; said coil being would about said magnetic core.

5. The improvement according to claim 1 further comprising a piece of soft steel mounted on said actuator and a magnetic core positioned for operable association with said magnet means in said first position and adapted to be excited by said coil.

6. The improvement according to claim 1 further including electric contacts operatively associated with said actuator; and wherein said delay circuit is connected to one of said contacts.

7. The improvement according to claim 1 wherein a single power supply provides power for the light flash generator means and for said coil.

8. The improvement according to claim 1 wherein said delay circuit includes a time constant circuit including a timing capacitor and wherein said resetting means includes an SCR, the gate of which is supplied with a pulse based upon a change of position of said actuator, said SCR being operatively connected to said timing capacitor.

9. The improvement according to claim 1 wherein said delay circuit includes a time constant circuit including a timing capacitor and wherein said resetting means includes a transistor, the base of which is supplied with a pulse based upon a change of position of said actuator, said transistor being operatively connected to said timing capacitor.

10. The improvement according to claim 1 wherein said delay circuit includes a time constant circuit including a timing capacitor, and a manually adjustable variable resistor for adjusting the time constant.

11. The improvement according to claim 1 wherein said switching means further includes a plastic molded housing; said knob extends from an upper aperture of said housing; said actuator is slideably mounted in said housing for movement in the rightward and leftward directions within said housing between said first and second positions; and electric contacts are operatively associated with said actuator; said magnet means is mounted on one end of said actuator; a magnetic core of soft steel operatively associated with said magnet means is provided at one end of said housing; and wherein said spring means is mounted in said housing and said coil is wound about said magnetic core.

12. The improvement according to claim 11 including a first conductive slider mounted on said actuator and a second conductive slider mounted on said housing, the contact between said first and second depending upon the position of said actuator within said housing.

13. The improvement according to claim 11 including a first cup-shaped yoke of soft steel mounted on one end of said actuator; said magnet means having its N and S poles aligned in the rightward and leftward directions and being in said first yoke; a second cup-shaped yoke made of soft steel mounted at one end of said housing and operably associated with said first yoke; said coil being mounted in said second yoke.

14. The improvement according to claim 11 wherein said magnet means has its magnetic poles aligned in the upward and downward directions and being mounted on one end of said actuator; a first soft steel yoke affixed to one pole of said magnet means with the end portion thereof extending to one side; a second soft steel yoke affixed to the other pole of said magnet means with the end portion thereof extending to one side; a magnetic core of soft steel mounted on one side of said housing for operable association with said yokes; said coil being wound about said magnetic core.

15. The improvement according to claim 11 wherein said magnet means is mounted on one end of said actuator, and further including a soft steel plate fixed to said magnet means on the actuator side thereof; said magnet means having its N and S poles aligned so that said soft steel plate is adapted to the magnetic path; a yoke made of soft steel having said coil mounted thereon and being provided on one side of said housing for operable association with said magnet means.

16. The improvement according to claim 1 including a plastic molded housing; said knob extends through an upper aperture of said housing; said actuator is slideably mounted in said housing for movement in the rightward and leftward directions within said housing between said first and second positions; electric contacts are operably associated with said actuator; a piece of soft steel is mounted on said actuator; a magnetic core operably associated with said piece of soft steel is mounted in said housing; said coil being wound about said magnetic core; and said spring means being mounted in said housing.

* * * * *

UNITED STATES PATENT AND TRADEMARK OFFICE
CERTIFICATE OF CORRECTION

PATENT NO. : 4,130,780
DATED : December 19, 1978
INVENTOR(S) : ITSUKI BAN

It is certified that error appears in the above-identified patent and that said Letters Patent are hereby corrected as shown below:

Column 2, line 51, change "begin" to --begins--.

Column 3, line 55, change "transistor" to --transistors--.

Column 4, line 2, change "it" to --if--.

Column 5, line 50, change "pot-shape" to --pot-shaped--.

Column 7, line 65, change "would" to --wound--.

Signed and Sealed this

Twelfth Day of June 1979

[SEAL]

Attest:

RUTH C. MASON
Attesting Officer

DONALD W. BANNER
Commissioner of Patents and Trademarks